United States Patent
Chen

(10) Patent No.: US 8,417,869 B2
(45) Date of Patent: Apr. 9, 2013

(54) HYBRID STORAGE APPARATUS AND HYBRID STORAGE MEDIUM CONTROLLER AND ADDRESSING METHOD THEREOF

(75) Inventor: Ban-Hui Chen, Hsinchu County (TW)

(73) Assignee: Phison Electronics Corp., Miaoli, Taiwna (TW)

( * ) Notice: Subject to any disclaimer, the term of this patent is extended or adjusted under 35 U.S.C. 154(b) by 254 days.

(21) Appl. No.: 12/907,026

(22) Filed: Oct. 18, 2010

(65) Prior Publication Data
US 2012/0059972 A1   Mar. 8, 2012

(30) Foreign Application Priority Data
Sep. 7, 2010   (TW) .............................. 99130228 A

(51) Int. Cl.
*G06F 12/00*   (2006.01)
(52) U.S. Cl.
USPC ............... 711/4; 711/103; 711/112; 711/170; 711/202; 711/205
(58) Field of Classification Search ............... 711/4, 103, 711/112, 170, 173, 202, 205–207, E12.001, 711/E12.008, E12.058
See application file for complete search history.

(56) References Cited

U.S. PATENT DOCUMENTS

| | | | |
|---|---|---|---|
| 7,330,323 B1 * | 2/2008 | Singh et al. | 360/48 |
| 2010/0037017 A1 * | 2/2010 | Ryu et al. | 711/112 |

* cited by examiner

*Primary Examiner* — Jasmine Song
(74) *Attorney, Agent, or Firm* — Jianq Chyun IP Office

(57) ABSTRACT

A hybrid storage apparatus including a non-volatile memory module, a hard disk module, and a hybrid storage medium controller is provided. The hybrid storage medium controller groups physical blocks of the non-volatile memory module into at least a storage area and a replacement area, and the hybrid storage medium controller configures a plurality of logical blocks for mapping to the physical blocks in the storage area and configures a plurality of logical disk addresses for mapping to physical disk addresses of the hard disk module. The hybrid storage medium controller further configures a plurality of logical access addresses to be accessed by a host system and initially maps a portion of the logical access addresses to the logical blocks and the other logical access addresses to a portion of the logical disk addresses. Accordingly, the hybrid storage apparatus can have improved data access performance and prolonged lifespan.

12 Claims, 17 Drawing Sheets

| Logical access address field | Mapping address field |
|---|---|
| 710(0) | 650(0) |
| 710(1) | 650(1) |
| ⋮ | ⋮ |
| 710(G) | 650(G) |
| 710(G+1) | 650(G+1) |
| 710(G+2) | 650(G+2) |
| ⋮ | ⋮ |
| 710(J) | 650(J) |

FIG. 10

HYBRID STORAGE APPARATUS AND HYBRID STORAGE MEDIUM CONTROLLER AND ADDRESSING METHOD THEREOF

CROSS-REFERENCE TO RELATED APPLICATION

This application claims the priority benefit of Taiwan application serial no. 99130228, filed on Sep. 7, 2010. The entirety of the above-mentioned patent application is hereby incorporated by reference herein and made a part of this specification.

BACKGROUND

1. Technology Field

The present invention generally relates to a hybrid storage apparatus and a hybrid storage medium controller and an addressing method thereof, and more particularly, to a hybrid storage apparatus which uses both a non-volatile memory module and a hard disk module as its storage media and a hybrid storage medium controller and an addressing method thereof.

2. Description of Related Art

Non-volatile memory (for example, flash memory) is broadly used for storing data due to its characteristics such as data non-volatility, low power consumption, small volume, and non-mechanical structure. For example, a solid state drive (SSD) is a storage apparatus which uses a non-volatile memory as its storage medium. Compared to the conventional hard disk, flash memory offers higher access speed. In particular, a computer system having a flash memory as its primary hard drive (i.e., the hard drive for installing operating system) has much better performance than a computer system having a conventional hard disk as its primary hard drive.

However, compared to flash memory, conventional hard disk has longer lifespan and larger capacity. To be specific, a flash memory can only be erased (or written) for a limited number of times. When data is repeatedly written into a physical block of a flash memory for over a specific number of times, the physical block cannot be used for writing data any more. In particular, when a flash memory is used as the primary hard drive for installing an operating system in a computer system, because data of the operating system is frequently accessed during the operation of the computer system, the lifespan of the flash memory is far shorter than that of a conventional hard disk. In addition, the cost of unit capacity of the conventional hard disk has been greatly reduced along with the development of the hard disk technology. Thus, a hard disk having a much larger capacity can be purchased at the same cost as a flash memory.

Since flash memory and conventional hard disk respectively have their disadvantages as described above, a hard disk having a flash memory as a cache is developed to improve the performance of hard disk. However, in such a hard disk, the flash memory is only used for storing data temporarily so as to allow the controller of the hard disk to respond to a host system instantly, and the controller still needs to move data from the flash memory into corresponding disk addresses.

Thereby, how to improve the performance of a storage apparatus and prolong the lifespan thereof has become a major subject in the industry.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention is directed to a hybrid storage apparatus and a hybrid storage medium controller and an addressing method thereof, wherein the data access speed is effectively increased and the lifespan of the hybrid storage apparatus is effectively prolonged.

According to an exemplary embodiment of the present invention, a hybrid storage apparatus including a connector, a non-volatile memory module, a hard disk module, and a hybrid storage medium controller is provided. The connector is configured for connecting to a host system. The non-volatile memory module has a plurality of physical blocks. The hard disk module has a plurality of physical disk addresses. The hybrid storage medium controller is coupled to the connector, the non-volatile memory module, and the hard disk module. The hybrid storage medium controller groups the physical blocks into at least a storage area and a replacement area and configures a plurality of logical blocks for mapping to the physical blocks in the storage area and a plurality of logical disk addresses for mapping to the physical disk addresses of the hard disk module. The hybrid storage medium controller also clusters the logical disk addresses into a first logical disk address cluster and a second logical disk address cluster, configures a plurality of logical access addresses to be accessed by the host system, and clusters the logical access addresses into a first logical access address cluster and a second logical access address cluster. The hybrid storage medium controller further initially maps the logical access addresses of the first logical access address cluster to the logical blocks and maps the logical access addresses of the second logical access address cluster to the logical disk addresses of the second logical disk address cluster.

According to an exemplary embodiment of the present invention, a hybrid storage medium controller for managing a non-volatile memory module and a hard disk module is provided, wherein the non-volatile memory module has a plurality of physical blocks, and the hard disk module has a plurality of physical disk addresses. The hybrid storage medium controller includes a host interface, a storage medium interface, and a storage medium management circuit. The host interface is configured for coupling to a host system. The storage medium interface is configured for coupling to the non-volatile memory module and the hard disk module. The storage medium management circuit is coupled to the host interface and the storage medium interface. The storage medium management circuit groups the physical blocks into at least a storage area and a replacement area and configures a plurality of logical blocks to be mapped to the physical blocks in the storage area and a plurality of logical disk addresses to be mapped to the physical disk addresses of the hard disk module. The storage medium management circuit also clusters the logical disk addresses into a first logical disk address cluster and a second logical disk address cluster, configures a plurality of logical access addresses to be accessed by the host system, and clusters the logical access addresses into a first logical access address cluster and a second logical access address cluster. The storage medium management circuit further initially maps the logical access addresses of the first logical access address cluster to the logical blocks and maps the logical access addresses of the second logical access address cluster to the logical disk addresses of the second logical disk address cluster.

According to an exemplary embodiment of the present invention, an addressing method adaptable to a storage apparatus having a non-volatile memory module and a hard disk module is provided, wherein the non-volatile memory module has a plurality of physical blocks, and the hard disk module has a plurality of physical disk addresses. The addressing method includes grouping the physical blocks into at least a storage area and a replacement area, configuring a plurality of logical blocks to be mapped to the physical blocks in the storage area and a plurality of logical disk addresses to be mapped to the physical disk addresses of the hard disk module, and clustering the logical disk addresses into a first logical disk address cluster and a second logical disk address cluster. The addressing method also includes configuring a plurality of logical access addresses to be accessed by a host system and clustering the logical access addresses into a first logical access address cluster and a second logical access address cluster. The addressing method further includes initially mapping the logical access addresses of the first logical access address cluster to the logical blocks and mapping the logical access addresses of the second logical access address cluster to the logical disk addresses of the second logical disk address cluster.

As described above, a hybrid storage apparatus and a hybrid storage medium controller and an addressing method thereof are provided in exemplary embodiments of the present invention, wherein the data access speed is effectively increased and the lifespan of the hybrid storage apparatus is effectively prolonged.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 10 illustrates an example of address mapping table based on the mapping relationship in FIG. 9.

DESCRIPTION OF THE EMBODIMENTS

Figure 1A:
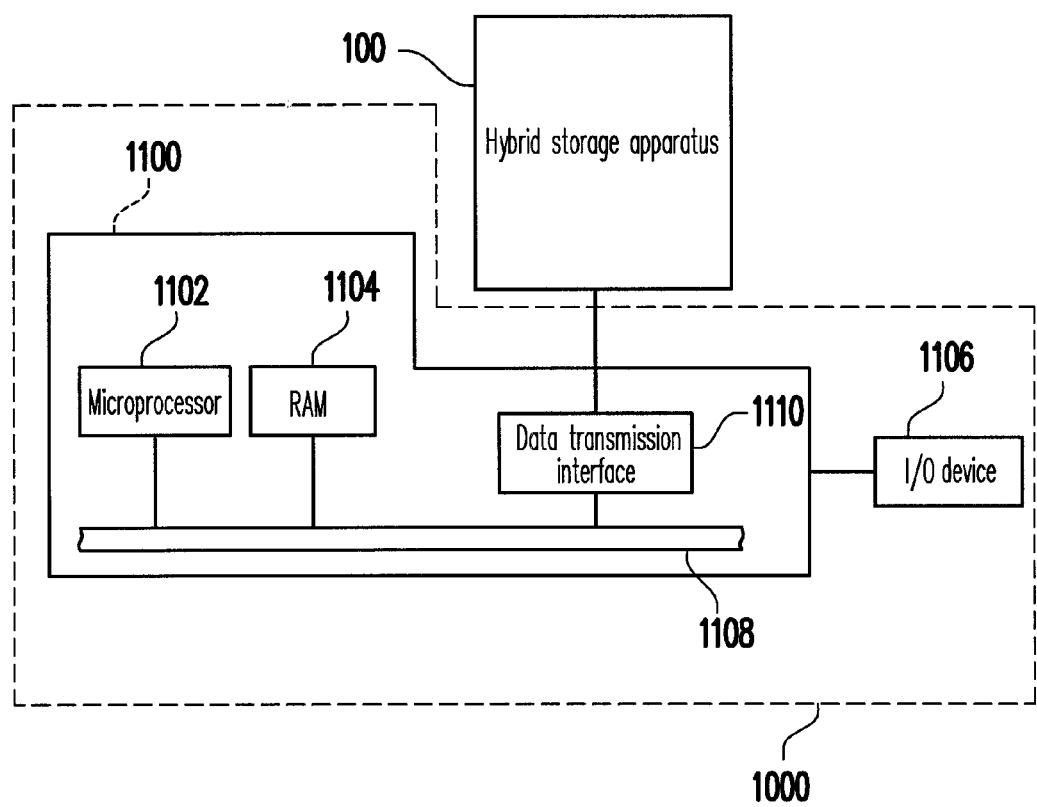
FIG. 1A illustrates a host system and a hybrid storage apparatus according to a first exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" "an" entity refers to one or more of that entity. As such, the terms "a" (or "an"), "one or more" and "at least one" can be used interchangeably herein.

First Exemplary Embodiment

FIG. 1A illustrates a host system and a hybrid storage apparatus according to the first exemplary embodiment of the present invention.

Figure 1B:
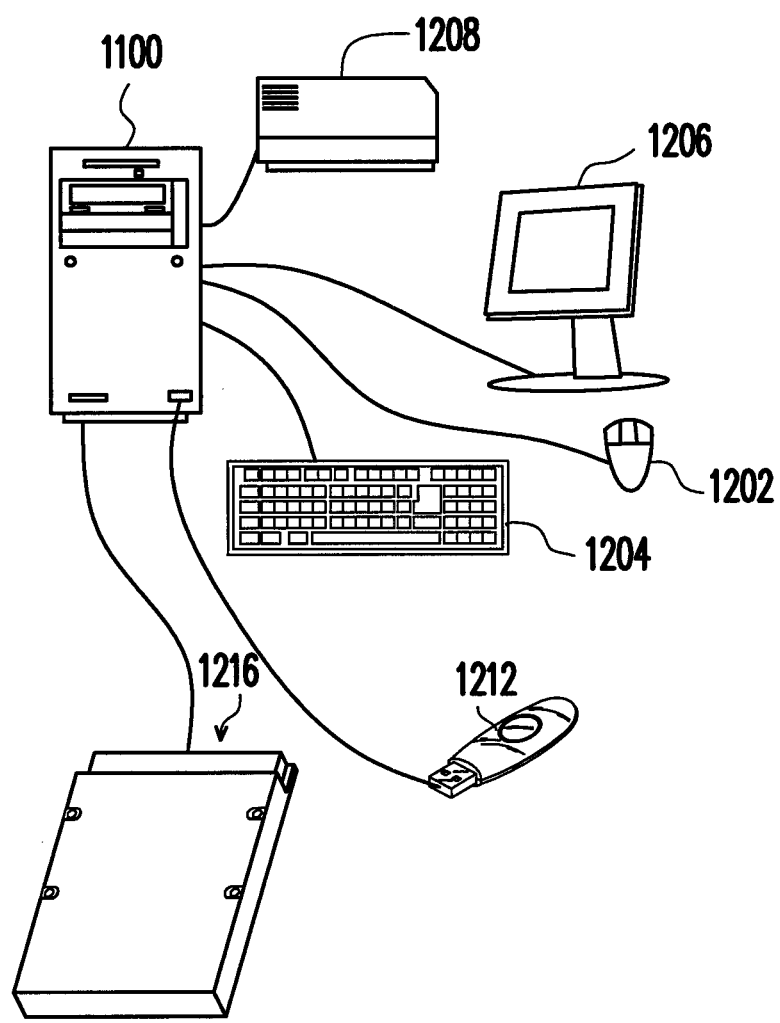
FIG. 1B is a diagram of a computer, an input/output (I/O) device, and a hybrid storage apparatus according to an exemplary embodiment of the present invention.

Referring to FIG. 1A, the host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 1B. However, the devices illustrated in FIG. 1B are not intended to limit the I/O device 1106, and the I/O device 1106 may further include other devices.

In the present embodiment, the hybrid storage apparatus 100 is coupled to other devices of the host system 1000 through the data transmission interface 1110. Through the operations of the microprocessor 1102, the RAM 1104, and the I/O device 1106, data can be written into or read from the hybrid storage apparatus 100.

Figure 2:
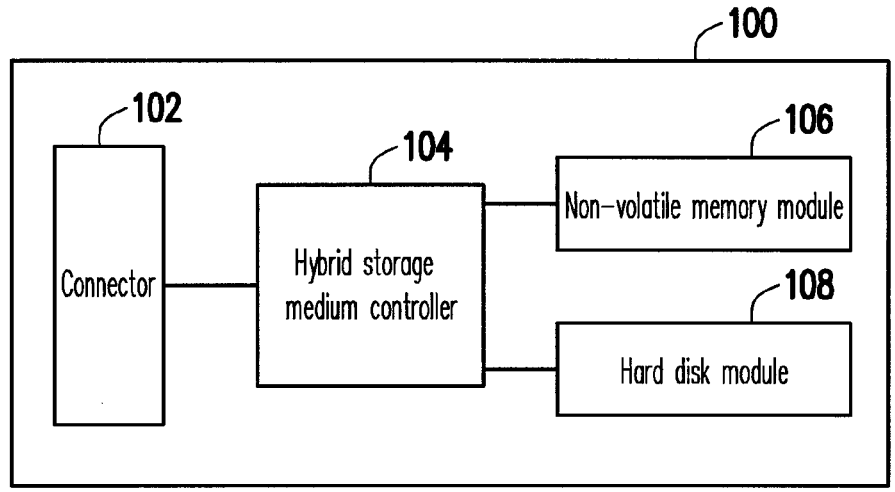
FIG. 2 is a schematic block diagram of the hybrid storage apparatus in FIG. 1A.

FIG. 2 is a schematic block diagram of the hybrid storage apparatus in FIG. 1A.

Referring to FIG. 2, the hybrid storage apparatus 100 includes a connector 102, a hybrid storage medium controller 104, a non-volatile memory module 106, and a hard disk module 108.

In the present exemplary embodiment, the connector 102 is a universal serial bus (USB) connector. However, the present invention is not limited thereto, and the connector 102 may also be an Institute of Electrical and Electronic Engineers (IEEE) 1394 connector, a peripheral component interconnect (PCI) express connector, a serial advanced technology attachment (SATA) connector, a secure digital (SD) interface connector, a memory stick (MS) interface connector, a multi media card (MMC) interface connector, a compact flash (CF) interface connector, an integrated device electronics (IDE) connector, or other suitable connectors.

The hybrid storage medium controller 104 executes a plurality of logic gates or control instructions implemented in hardware form or firmware form and performs various data operations on the non-volatile memory module 106 according to instructions of the host system 1000. In particular, the hybrid storage medium controller 104 accesses the non-volatile memory module 106 and the hard disk module 108 through the addressing method of the first exemplary embodiment of the present invention. Below, the addressing method of the first exemplary embodiment of the present invention will be described in detail with reference to accompanying drawings.

The non-volatile memory module 106 is coupled to the hybrid storage medium controller 104 and configured for storing data written by the host system 1000. The non-volatile memory module 106 includes a plurality of physical blocks. Each physical block has a plurality of pages, wherein the pages belonging to the same physical block can be respectively written but have to be erased together. To be specific, each physical block is the smallest erasing unit. Namely, each physical block contains the least number of memory cells that are erased together. Each page is the smallest programming unit. Namely, each page is the smallest unit for writing data. In other exemplary embodiments, the smallest unit for writing data may also be sector, wherein the capacity of each sector is smaller than that of each page. Each page usually has a data area and a redundant area. The data area is used for storing user data, and the redundant area is used for storing system data (for example, an error checking and correcting (ECC) code). The configuration of the data area and the redundant area is well known to those skilled in the art therefore will not be described herein. In the present exemplary embodiment, the non-volatile memory module 106 is a multi level cell (MLC) NAND flash memory module. However, the present invention is not limited thereto, and the non-volatile memory module 106 may also be a single level cell (SLC) NAND flash memory module, a flash memory module, or other memory modules having the same characteristics.

The hard disk module 108 is coupled to the hybrid storage medium controller 104 and configured for storing data written by the host system 1000. The hard disk module 108 has a plurality of magnetic disks as its storage medium. The magnetic disks have a plurality of physical disk addresses, and the pickup head (not shown) of the hard disk module 108 moves on the magnetic disks to access data at these physical disk addresses.

It should be mentioned that in the present exemplary embodiment, the non-volatile memory module 106 and the hard disk module 108 are respectively coupled to the hybrid storage medium controller 104 through different data buses. However, the present invention is not limited thereto, and in another exemplary embodiment of the present invention, the non-volatile memory module 106 and the hard disk module 108 may also be coupled to the hybrid storage medium controller 104 through the same data bus, and in this case, the hybrid storage medium controller 104 selectively transmits data to the non-volatile memory module 106 or the hard disk module 108 by driving different chip enabling pins.

Figure 3:
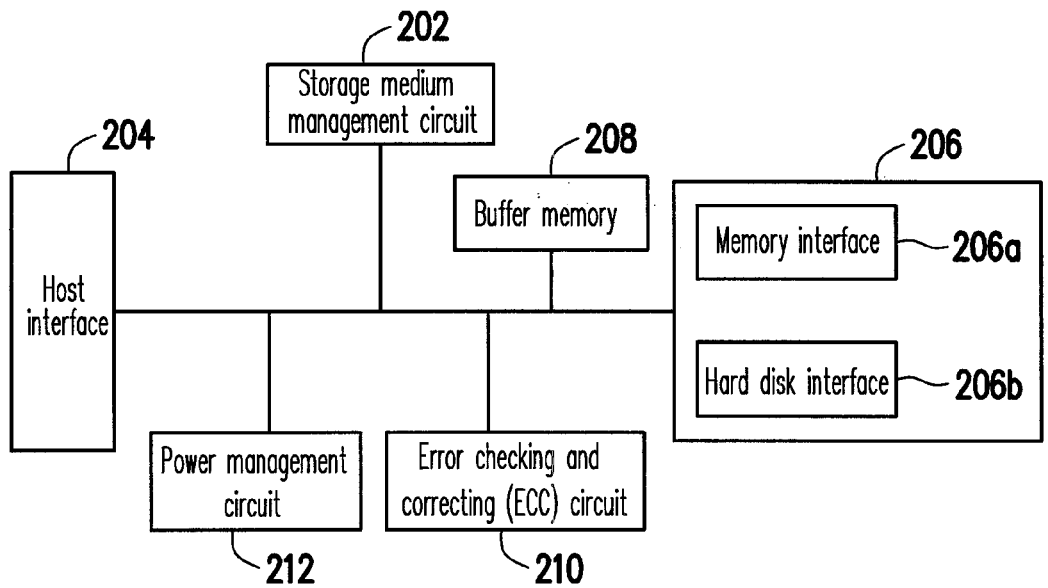
FIG. 3 is a schematic block diagram of a memory controller according to the first exemplary embodiment of the present invention.

FIG. 3 is a schematic block diagram of a memory controller according to the first exemplary embodiment of the present invention.

Referring to FIG. 3, the hybrid storage medium controller 104 includes a storage medium management circuit 202, a host interface 204, and a storage medium interface 206.

The storage medium management circuit 202 controls the operation of the hybrid storage medium controller 104 to write, read, or erase data. For example, the storage medium management circuit 202 has a plurality of control instructions, and during the operation of the hybrid storage apparatus 100, the control instructions are executed to access and manage the storage spaces of the non-volatile memory module 106 and the hard disk module 108 through the addressing method of the present exemplary embodiment.

In the present exemplary embodiment, the control instructions of the storage medium management circuit 202 are implemented in a firmware form. For example, the storage medium management circuit 202 has a microprocessor unit (not shown) and a read-only memory (ROM, not shown), and the control instructions are burnt into the ROM. When the hybrid storage apparatus 100 is in operation, the control instructions are executed by the microprocessor unit to accomplish the addressing method of the present embodiment.

In another exemplary embodiment of the present invention, the control instructions of the storage medium management circuit 202 may also be stored in a specific area (for example, the system area in a memory module used exclusively for storing system data) of the non-volatile memory module 106 as program codes. Correspondingly, the storage medium management circuit 202 may have a microprocessor unit (not shown), a ROM (not shown), and a RAM (not shown). In particular, the ROM may have a driving code segment. When the hybrid storage medium controller 104 is enabled, the microprocessor unit executes the driving code segment to load the control instructions from the non-volatile memory module 106 into the RAM of the storage medium management circuit 202. After that, the microprocessor unit executes these control instructions to accomplish the addressing method according to the present exemplary embodiment. In yet another exemplary embodiment of the present invention, the control instructions of the storage medium management circuit 202 may also be implemented in a hardware form.

The host interface 204 is coupled to the storage medium management circuit 202, and which receives and identifies instructions and data from the host system 1000. Namely, instructions and data from the host system 1000 are transmitted to the storage medium management circuit 202 through the host interface 204. In the present exemplary embodiment, the host interface 204, corresponding to the connector 102, is a USB interface. However, the present invention is not limited thereto, and the host interface 204 may also be an IEEE 1394 interface, a PCI express interface, a SD interface, a MS interface, a MMC interface, a CF interface, a SATA interface, an IDE interface, or other suitable data transmission interfaces.

The storage medium interface 206 is coupled to the storage medium management circuit 202, and configured for accessing the non-volatile memory module 106 and the hard disk module 108. For example, the storage medium interface 206 includes a memory interface 206a and a hard disk interface 206b. Data to be written into the non-volatile memory module 106 is converted by the memory interface 206a into a format acceptable to the non-volatile memory module 106, and data to be written into the hard disk module 108 is converted by the hard disk interface 206b into a format acceptable to the hard disk module 108.

In an exemplary embodiment of the present invention, the hybrid storage medium controller 104 further includes a buffer memory 208. The buffer memory 208 is coupled to the storage medium management circuit 202 and configured for temporarily storing data and instructions from the host system 1000 or data from the non-volatile memory module 106. Herein the buffer memory 208 is a static random-access memory (SRAM). However, the present invention is not limited thereto, and in another exemplary embodiment, the buffer memory 208 may also be a dynamic random access memory (DRAM) or other suitable memories.

In an exemplary embodiment of the present invention, the hybrid storage medium controller 104 further includes an ECC circuit 210. The ECC circuit 210 is coupled to the storage medium management circuit 202, and configured for executing an ECC procedure to ensure the accuracy of data. For example, when the storage medium management circuit 202 receives a write command from the host system 1000, the ECC circuit 210 generates an ECC code for the data corresponding to the write command, and the storage medium management circuit 202 writes the data corresponding to the write command and the ECC code corresponding to the data into the non-volatile memory module 106 or the hard disk module 108. Subsequently, when the storage medium management circuit 202 reads the data from the non-volatile memory module 106 or the hard disk module 108, it also reads the ECC code corresponding to the data, and the ECC circuit 210 executes the ECC procedure on the data according to the ECC code.

In an exemplary embodiment of the present invention, the hybrid storage medium controller 104 further includes a power management circuit 212. The power management circuit 212 is coupled to the storage medium management circuit 202, and configured for controlling the power supply of the hybrid storage apparatus 100.

Figure 4:
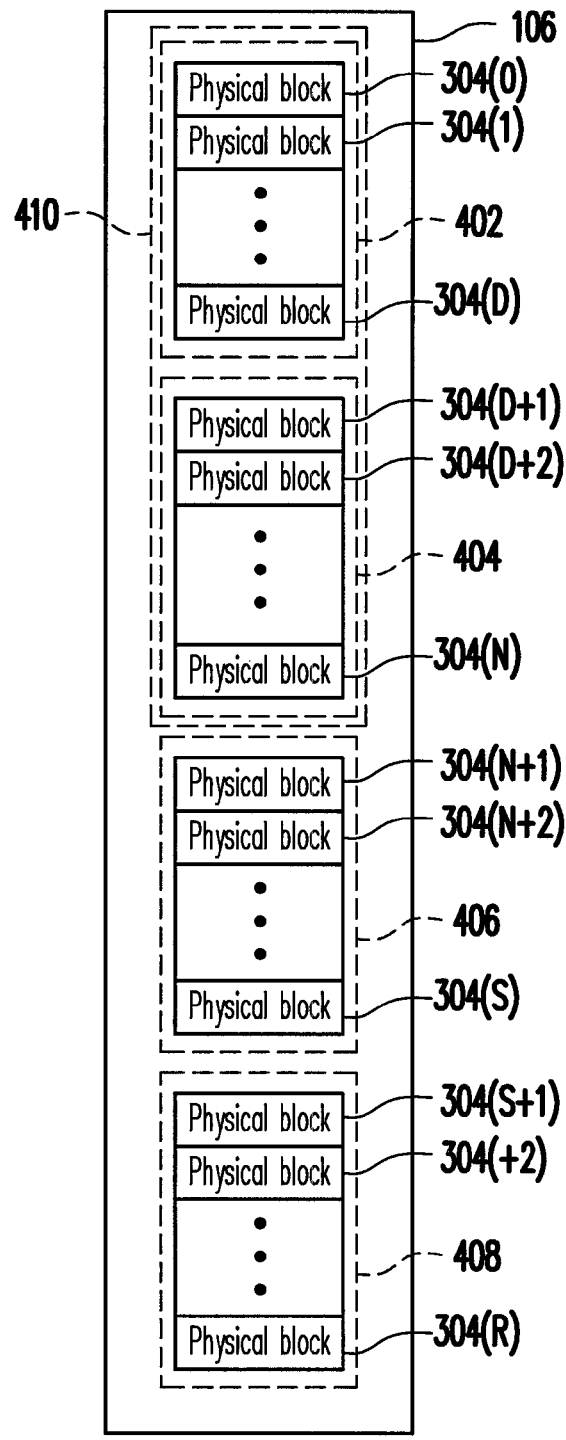
FIG. 4 and FIG. 5 illustrate an example of how a non-volatile memory module is managed according to the first exemplary embodiment of the present invention.
Figure 5:
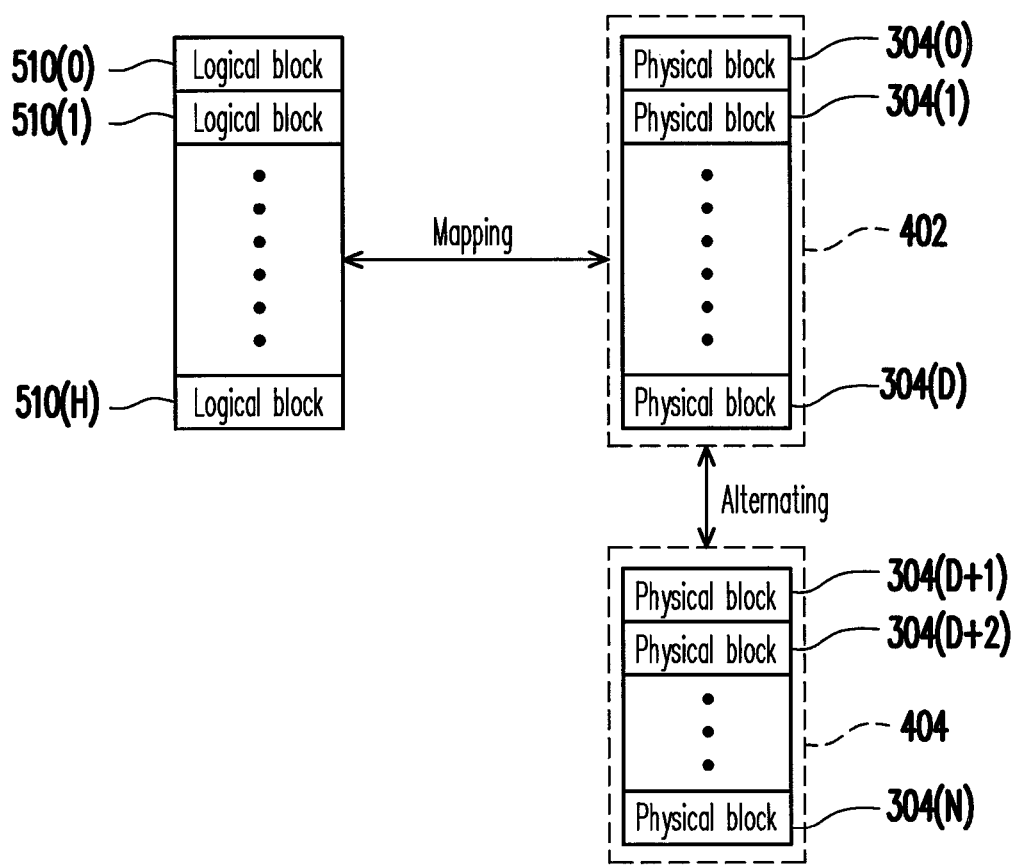

FIG. 4 and FIG. 5 illustrate an example of how a non-volatile memory module is managed according to the first exemplary embodiment of the present invention.

It should be understood that the terms used for describing the operations executed on the physical blocks of the non-volatile memory module 106, such as "get", "select", "substitute", "group", and "alternate", only refer to logical operations. Namely, the actual positions of the physical blocks of the non-volatile memory module 106 are not changed. Instead, the physical blocks of the non-volatile memory module 106 are only logically operated.

Referring to FIG. 4, the storage medium management circuit 202 of the hybrid storage medium controller 104 logically groups the physical blocks 304(0)-304(R) of the non-volatile memory module 106 into a storage area 410, a system area 406, and a replacement area 408, wherein the storage area 410 includes a data area 402 and a spare area 404.

The physical blocks logically belonging to the storage area 410 are used for storing data from the host system 1000. To be specific, the physical blocks in the data area 402 are already used for recording data, and the physical blocks in the spare area 404 are used for substituting the physical blocks in the data area 402. Thus, the physical blocks in the spare area 404 are blank or available physical blocks (i.e., no data is recorded therein or data recorded therein is marked as invalid). Namely, the physical blocks in the spare area 404 are already erased, or when a physical block is gotten from the spare area 404 for storing data, the gotten physical block is erased before being used for storing data. In other words, the physical blocks in the spare area 404 are available physical blocks.

The physical blocks logically belonging to the system area 406 are used for storing system data, wherein the system data may include the manufacturer and model of the non-volatile memory module, the number of physical blocks in the non-volatile memory module, and the number of pages in each physical block.

The physical blocks logically belonging to the replacement area 408 are replacement physical blocks. For example, when the non-volatile memory module 106 is manufactured, 4% of its physical blocks are reserved for replacement purpose. Namely, when a physical block in the data area 402, the spare area 404, or the system area 406 is damaged, a physical block in the replacement area 408 is used for replacing the damaged physical block (i.e., bad block). Accordingly, if there are still normal physical blocks in the replacement area 408 and a physical block is damaged, the storage medium management circuit 202 gets a normal physical block from the replacement area 408 for replacing the damaged physical block.

It should be mentioned that the numbers of physical blocks in the data area 402, the spare area 404, the system area 406, and the replacement area 408 vary along with the memory specifications. In addition, it should be understood that the grouping relationships of grouping the physical blocks into the data area 402, the spare area 404, the system area 406, and the replacement area 408 dynamically change during the operation of the hybrid storage apparatus 100. For example, when a physical block in the spare area 404 is damaged and replaced by a physical block in the replacement area 408, the physical block originally belonging to the replacement area 408 is associated with the spare area 404.

Referring to FIG. 5, as described above, the physical blocks in the data area 402 and the spare area 404 are alternatively used for storing data written by the host system 1000. In the present exemplary embodiment, the storage medium management circuit 202 configures logical blocks 510(0)-510(H) for mapping to foregoing physical blocks which are alternatively used for storing data, and the storage medium management circuit 202 maps the logical blocks 510(0)-510(H) to logical access addresses which are provided to the host system 1000 to be accessed so that the host system 1000 can access data accordingly. In particular, the storage medium management circuit 202 initially maps the logical blocks 510(0)-510(H) to the physical blocks of the data area 402. For example, after the hybrid storage apparatus 100 is manufactured, the logical blocks 510(0)-510(H) are respectively mapped to the physical blocks 304(0)-304(D) of the data area 402. Namely, one logical block is mapped to at least one physical block in the data area 402. Herein the storage medium management circuit 202 establishes a logical block-physical block mapping table to record the mapping relationships between the logical blocks and the physical blocks.

Figure 6:
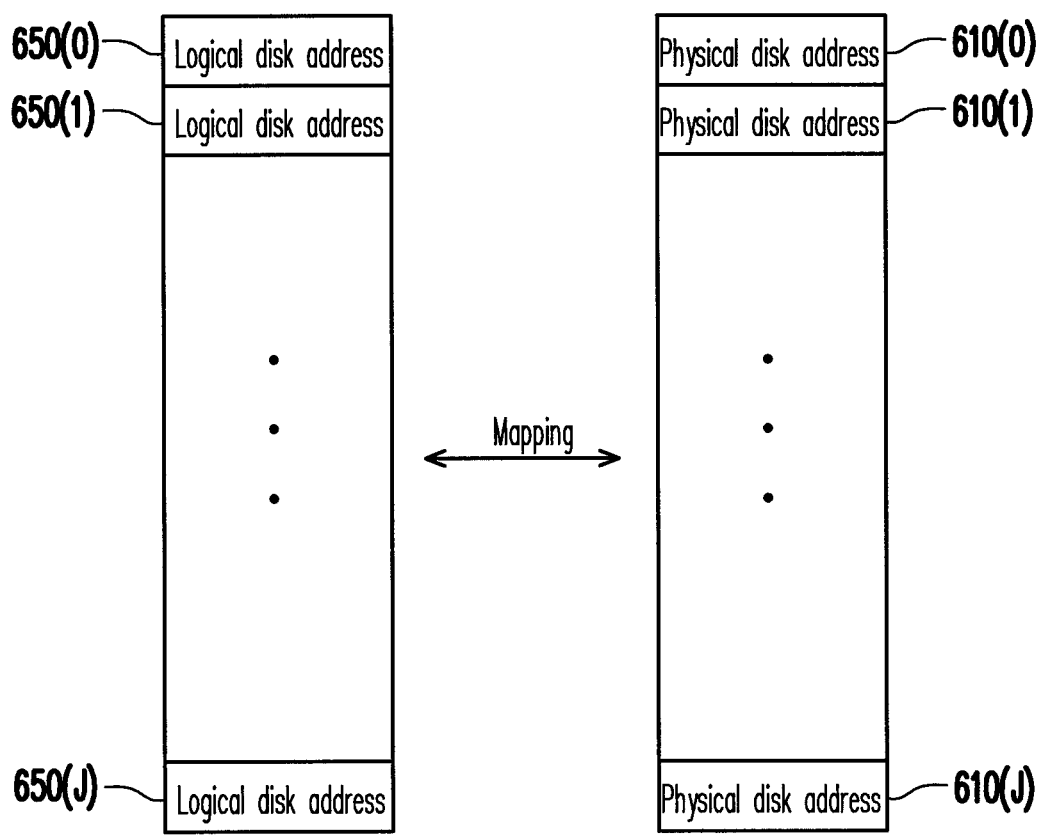
FIG. 6 illustrates an example of managing a hard disk module according to the first exemplary embodiment of the present invention.

FIG. 6 illustrates an example of managing a hard disk module according to the first exemplary embodiment of the present invention.

Referring to FIG. 6, as described above, the hard disk module 108 has a plurality of magnetic disks, and each of the magnetic disks has a plurality of physical disk addresses (for example, the physical disk addresses 610(0)-610(J)). Each physical disk address is expressed as a multidimensional address containing a disk volume number, a track number, and a sector number. In the present exemplary embodiment, the storage medium management circuit 202 configures logical disk addresses 650(0)-650(J) (expressed as one-dimensional addresses) for mapping to the physical disk addresses and maps the logical disk addresses 650(0)-650(J) to the logical access addresses that are accessed by the host system 1000, so that the host system 1000 can access data conveniently.

Figure 7:
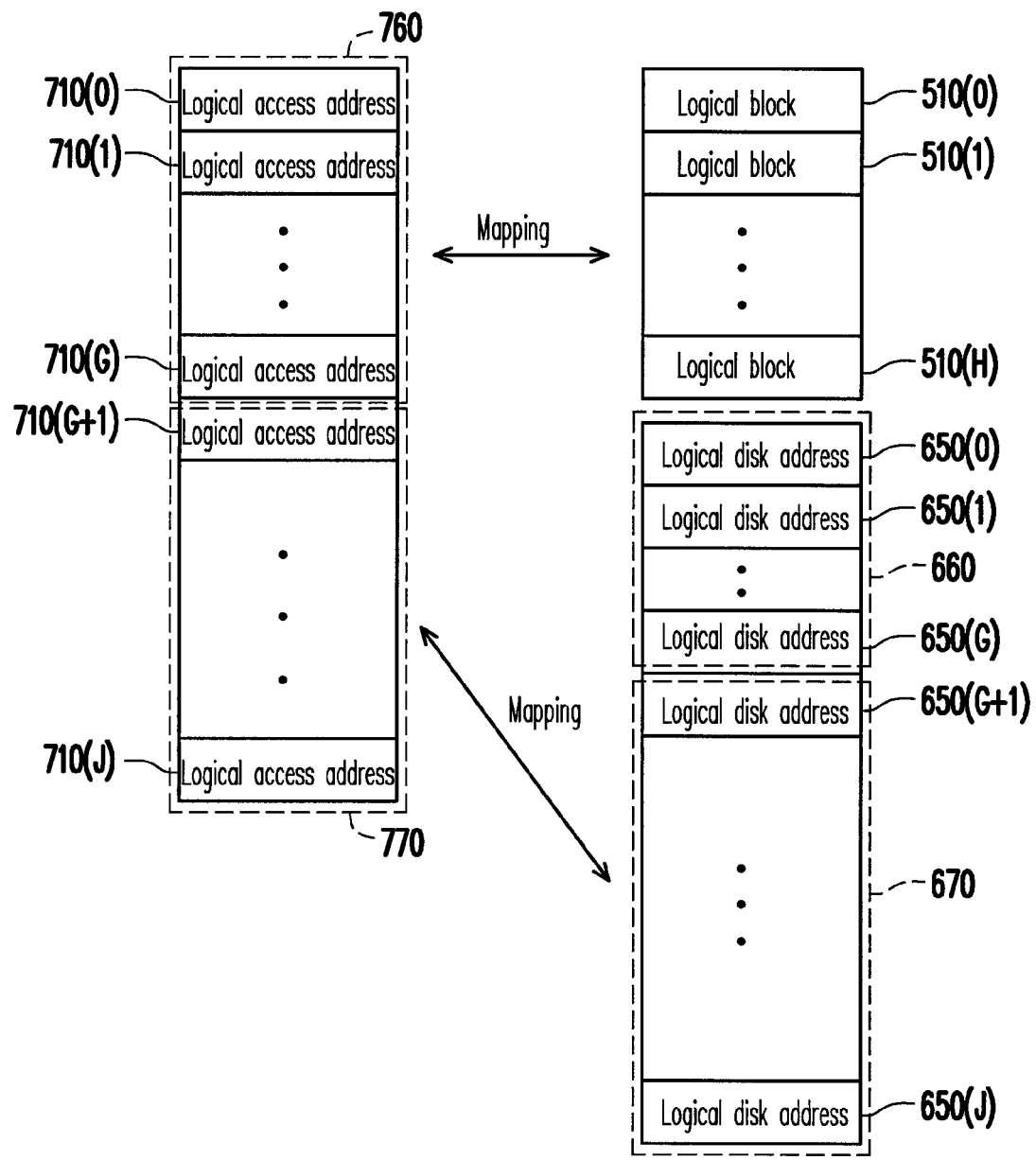
FIG. 7 illustrates an example of initial addressing according to the first exemplary embodiment of the present invention.

FIG. 7 illustrates an example of initial addressing according to the first exemplary embodiment of the present invention.

Referring to FIG. 7, in the present exemplary embodiment, when the hybrid storage apparatus 100 is formatted (for example, the operating system of the host system 1000 formats the hybrid storage apparatus 100 according to a file system, such as FAT 32), the storage medium management circuit 202 of the hybrid storage medium controller 104 maps the logical blocks 510(0)-510(H) and a portion of the logical disk addresses 650(0)-650(J) to the logical access addresses 710(0)-710(J) that are accessed by the host system 1000.

To be specific, the storage medium management circuit 202 groups the logical disk addresses 650(0)-650(G) into a first logical disk address cluster 660 and groups the logical disk addresses 650(G+1)-650(J) into a second logical disk address cluster 670. Particularly, in the present exemplary embodiment, the size of the logical disk addresses 650(0)-650(G) in the first logical disk address cluster 660 is the same as the size of the logical blocks 510(0)-510(H).

In addition, the storage medium management circuit 202 groups the logical access addresses 710(0)-710(J) into a first logical access address cluster 760 and a second logical access address cluster 770, wherein first logical access address cluster 760 contains the logical access addresses 710(0)-710(G) and the second logical access address cluster 770 contains the logical access addresses 710(G+1)-710(J). In particular, the size of the logical access addresses 710(0)-710(G) in the first logical access address cluster 760 is the same as the size of the logical blocks 510(0)-510(H), and the size of the logical access addresses 710(G+1)-710(J) in the second logical access address cluster 770 is the same as the size of the logical disk addresses 650(G+1)-650(J) in the second logical disk address cluster 670.

In particular, the storage medium management circuit 202 maps the logical access addresses 710(0)-710(G) in the first logical access address cluster 760 to the logical blocks 510(0)-510(H) and maps the logical access addresses 710(G+1)-710(J) in the second logical access address cluster 770 to the logical disk addresses 650(G+1)-650(J) in the second logical disk address cluster 670. To be specific, the storage medium management circuit 202 records the mapping relationships between the logical access addresses and the logical blocks and the mapping relationships between the logical access addresses and the logical disk addresses in an address mapping table to complete the addressing process. Thereby, when the host system 1000 gives a write or read command to access the logical access addresses 710(0)-710(J), the storage medium management circuit 202 writes data into or reads data from the non-volatile memory module 106 or the hard disk module 108 according to the address mapping table.

Figure 8:
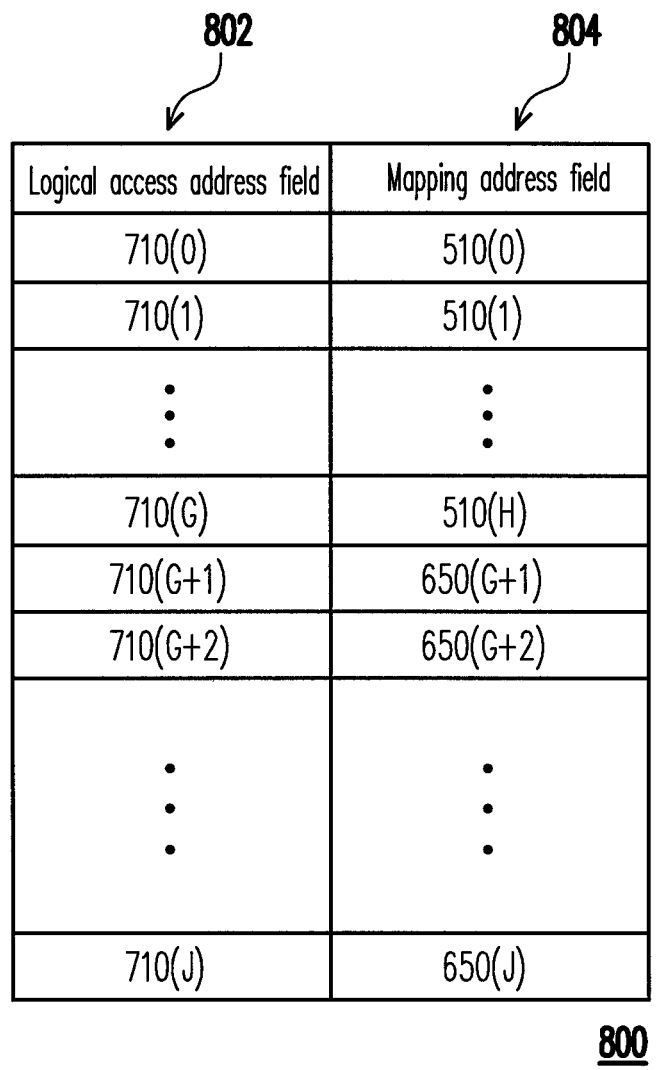
FIG. 8 illustrates an example of initial address mapping table based on the mapping relationship in FIG. 7.

FIG. 8 illustrates an example of initial address mapping table based on the mapping relationship in FIG. 7.

Referring to FIG. 8, the address mapping table 800 includes a logical access address field 802 and a mapping address field 804, wherein the logical access address field 802 records the logical access addresses, and the mapping address field 804 records the corresponding mapping addresses.

For example, when the hybrid storage apparatus 100 is initialized after it is manufactured, the logical access addresses 710(0)-710(G) are respectively mapped to the logical blocks 510(0)-510(H), and the logical access addresses 710(G+1)-710(J) are respectively mapped to the logical disk addresses 650(G+1)-650(J).

In the present exemplary embodiment, the address mapping table 800 is stored in the logical disk addresses 650(0)-650(G) of the first logical disk address cluster 660. Namely, the storage medium management circuit 202 stores the address mapping table 800 in the physical disk addresses mapped to the logical disk addresses 650(0)-650(G). To be specific, as shown in FIG. 7, the logical disk addresses 650(0)-650(G) of the first logical disk address cluster 660 are not provided to the host system 1000. Thus, the physical disk addresses 610(0)-610(G) mapped to the logical disk addresses 650(0)-650(G) are not used. Accordingly, the physical disk addresses 610(0)-610(G) mapped to the logical disk addresses 650(0)-650(G) can be used for storing the address mapping table 800.

In another exemplary embodiment of the present invention, the address mapping table 800 may also be stored in the system area 406, and during the operation of the hybrid storage apparatus 100, the storage medium management circuit 202 may access data according to the address mapping table 800.

In the present exemplary embodiment, the logical access addresses 710(0)-710(G) among the logical access addresses 710(0)-710(J) accessed by the host system 1000 are arranged in front. Generally speaking, when the hybrid storage apparatus 100 is used as the primary hard drive for installing the operating system, the operating system is installed in the logical access addresses 710(0)-710(G). Because the logical access addresses 710(0)-710(G) are mapped to the logical blocks 510(0)-510(H) of the non-volatile memory module 106, the data access performance of the hybrid storage apparatus 100 is higher than a conventional hard drive composed of magnetic disks.

In the present exemplary embodiment, during the operation of the hybrid storage apparatus 100, the storage medium management circuit 202 of the hybrid storage medium controller 104 constantly records the number of bad blocks in the non-volatile memory module 106. When the number of bad blocks in the non-volatile memory module 106 exceeds a predetermined threshold, the storage medium management circuit 202 executes a re-mapping procedure on the logical access addresses 710(0)-710(G).

Herein the predetermined threshold can be any appropriate value. In the present exemplary embodiment, the predetermined threshold is 90% of the number of physical blocks in the replacement area 408 when the hybrid storage apparatus 100 is initialized. To be specific, as described above, when a bad block is detected in the non-volatile memory module 106, the storage medium management circuit 202 gets a normal physical block from the replacement area 408 for replacing the bad block. If there is no normal physical block in the replacement area 408, the non-volatile memory module 106 cannot be used for storing data any more. Namely, when 90% of the normal physical blocks in the replacement area 408 have been used for replacing bad blocks, the storage medium management circuit 202 executes the re-mapping procedure on the logical access addresses 710(0)-710(G) to prolong the lifespan of the hybrid storage apparatus 100.

To be specific, in the re-mapping procedure, the storage medium management circuit 202 copies data from the physical blocks mapped to the logical blocks 510(0)-510(H) to the physical disk addresses mapped to the logical disk addresses 650(0)-650(G) of the first logical disk address cluster 660. After that, the storage medium management circuit 202 re-maps the logical access addresses 710(0)-710(G) to the logical disk addresses 650(0)-650(G) of the first logical disk address cluster 660.

Figure 9:
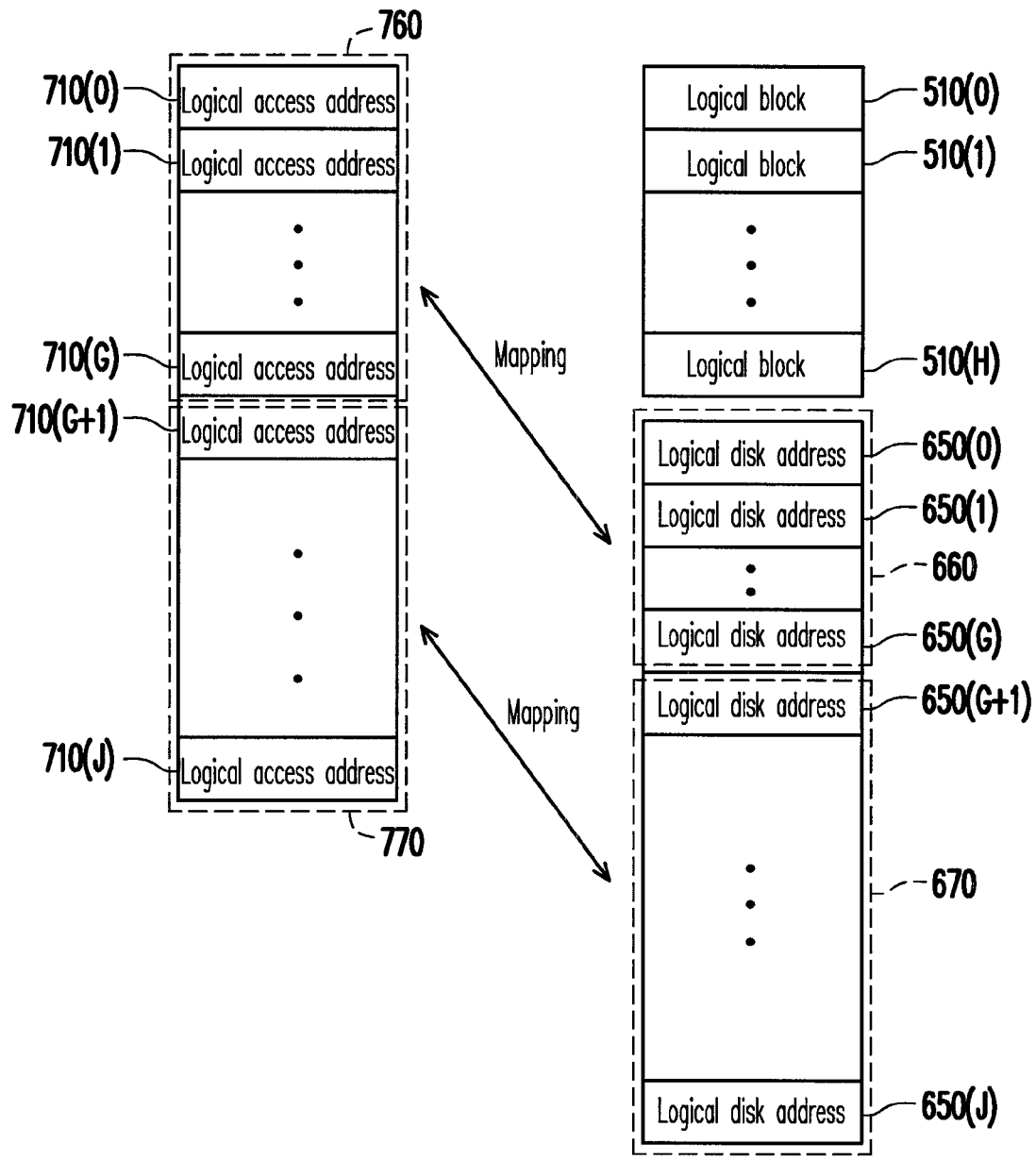
FIG. 9 illustrates an example of addressing after a re-mapping procedure is executed according to the first exemplary embodiment of the present invention.

FIG. 9 illustrates an example of addressing after a re-mapping procedure is executed according to the first exemplary embodiment of the present invention.

Referring to FIG. 9, the storage medium management circuit 202 re-maps the logical access addresses 710(0)-710(G) of the first logical access address cluster 760 to the logical disk addresses 650(0)-650(G) of the first logical disk address cluster 660. The logical access addresses 710(G+1)-710(J) of the second logical access address cluster 770 are still mapped to the logical disk addresses 650(G+1)-650(J) of the second logical disk address cluster 670. Accordingly, when the host system 1000 gives a write or read command to access the logical access addresses 710(0)-710(J), the storage medium management circuit 202 writes data into or reads data from the hard disk module 108 according to the new mapping relationships.

It should be mentioned that because the logical access addresses 710(0)-710(J) are mapped to the logical disk addresses 650(0)-650(J) of the hard disk module 108 on a one-to-one basis after the re-mapping procedure is executed, in the present exemplary embodiment, the storage medium management circuit 202 may also directly access the physical disk addresses 610(0)-610(J) mapped to the logical disk addresses 650(0)-650(J) according to the logical access addresses 710(0)-710(J) without using the address mapping table 800. Thus, in the present exemplary embodiment, the address mapping table 800 is erased after the re-mapping procedure is executed.

In another exemplary embodiment of the present invention, the address mapping table 800 is stored in the system area 406, and the storage medium management circuit 202 updates the address mapping table 800 when the re-mapping procedure is executed. For example, as shown in FIG. 10, the address mapping table is updated according to the mapping relationship in FIG. 9. Thereby, the storage medium management circuit 202 accesses data according to the updated address mapping table 800.

Figure 11:
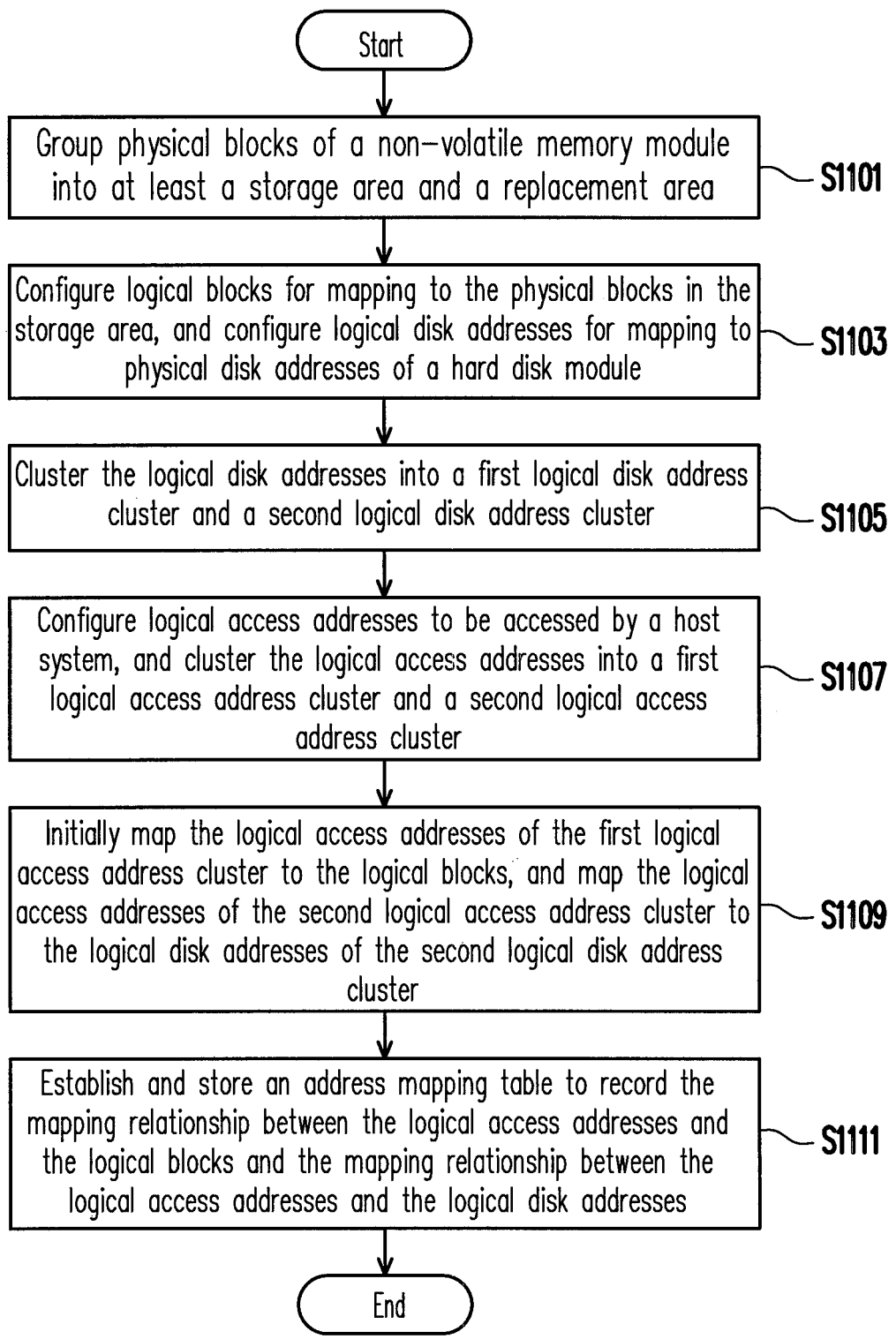
FIG. 11 is a flowchart of an addressing method according to the first exemplary embodiment of the present invention.

FIG. 11 is a flowchart of an addressing method according to the first exemplary embodiment of the present invention, wherein the steps for initially addressing the storage space in the hybrid storage apparatus 100 are illustrated.

Referring to FIG. 11, in step S1101, the hybrid storage medium controller 104 groups the physical blocks of the non-volatile memory module 106 into at least a storage area and a replacement area. For example, the physical blocks of the non-volatile memory module 106 are grouped into the storage area, the system area 406, and the replacement area 408, wherein the storage area includes the data area 402 and the spare area 404.

In step S1103, the hybrid storage medium controller 104 configures the logical blocks 510(0)-510(H) for mapping to the physical blocks in the storage area, and the hybrid storage medium controller 104 configures the logical disk addresses 650(0)-650(J) for mapping to the physical disk addresses 610(0)-610(J) of the hard disk module 108.

Next, in step S1105, the hybrid storage medium controller 104 groups the logical disk addresses 650(0)-650(J) into the first logical disk address cluster 660 and the second logical disk address cluster 670.

In step S1107, the hybrid storage medium controller 104 configures the logical access addresses 710(0)-710(J) to be accessed by the host system 1000, and the hybrid storage medium controller 104 groups the logical access addresses 710(0)-710(J) into the first logical access address cluster 760 and the second logical access address cluster 770.

In step S1109, the hybrid storage medium controller 104 initially maps the logical access addresses 710(0)-710(G) of the first logical access address cluster 760 to the logical blocks 510(0)-510(H) and maps the logical access addresses 710(G+1)-710(J) of the second logical access address cluster 770 to the logical disk addresses 650(G)-650(J) of the second logical disk address cluster 670. Finally, in step S1111, the hybrid storage medium controller 104 establishes and stores the address mapping table 800 to record the mapping relationships between the logical access addresses and the logical blocks and the mapping relationships between the logical access addresses and the logical disk addresses.

Figure 12A:
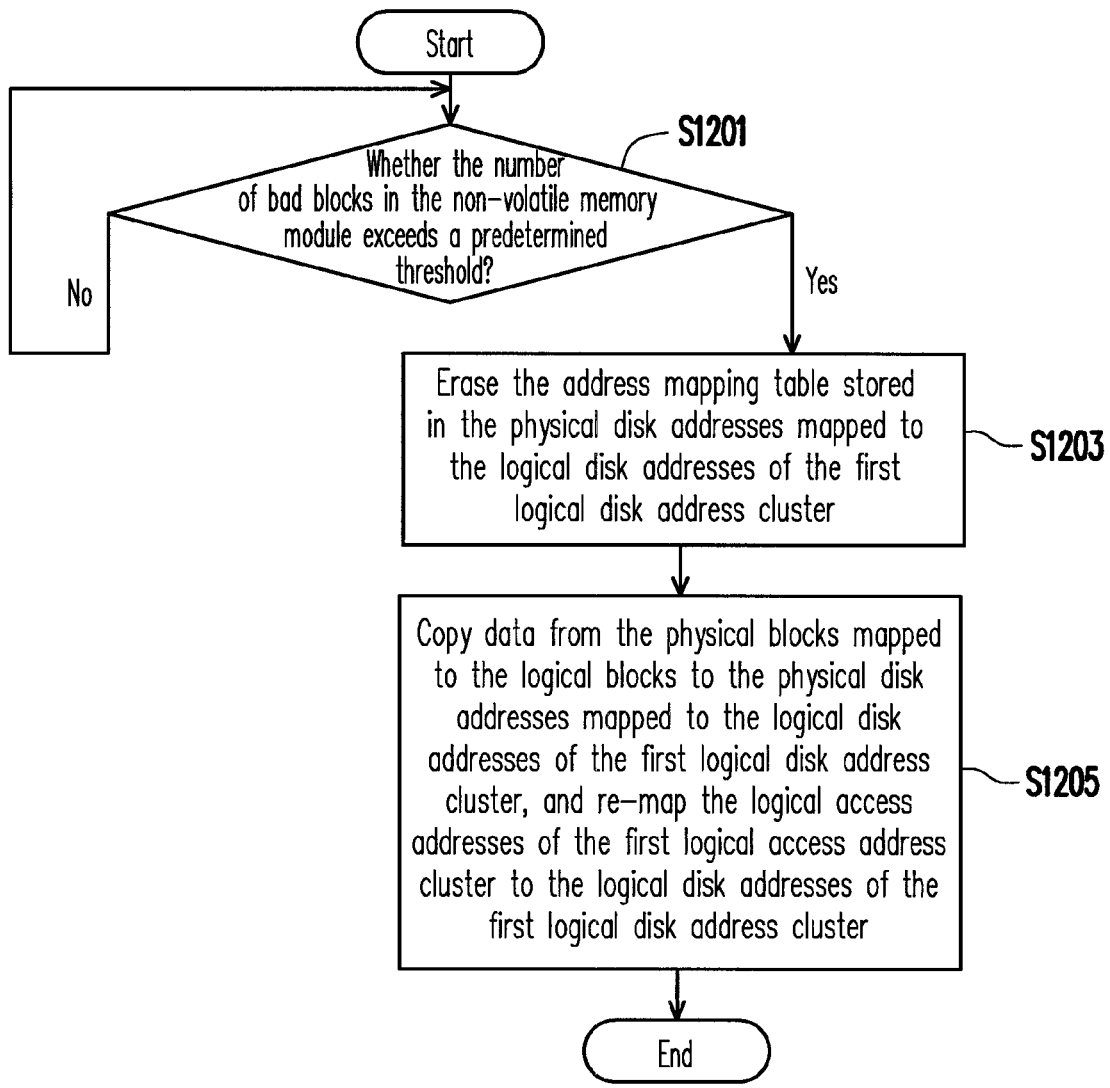
FIG. 12A is a flowchart of a re-mapping procedure according to the first exemplary embodiment of the present invention.

FIG. 12A is a flowchart of a re-mapping procedure according to the first exemplary embodiment of the present invention.

Referring to FIG. 12A, during the operation of the hybrid storage apparatus 100, in step S1201, the hybrid storage medium controller 104 constantly detects whether the number of bad blocks in the non-volatile memory module 106 exceeds the predetermined threshold.

If the number of bad blocks in the non-volatile memory module 106 does not exceed the predetermined threshold, the procedure illustrated in FIG. 12 returns to step S1201.

If the number of bad blocks in the non-volatile memory module 106 exceeds the predetermined threshold, in step S1203, the hybrid storage medium controller 104 erases the address mapping table 800 stored in the physical disk addresses 610(0)-610(G) mapped to the logical disk addresses 650(0)-650(G) of the first logical disk address cluster 660. After that, in step S1205, the hybrid storage medium controller 104 copies the data from the physical blocks mapped to the logical blocks 510(0)-510(H) to the physical disk addresses 610(0)-610(G) mapped to the logical disk addresses 650(0)-650(G) of the first logical disk address cluster 660 and re-maps the logical access addresses 710(0)-710(G) of the first logical access address cluster 760 to the logical disk addresses 650(0)-650(G) of the first logical disk address cluster 660.

Figure 12B:
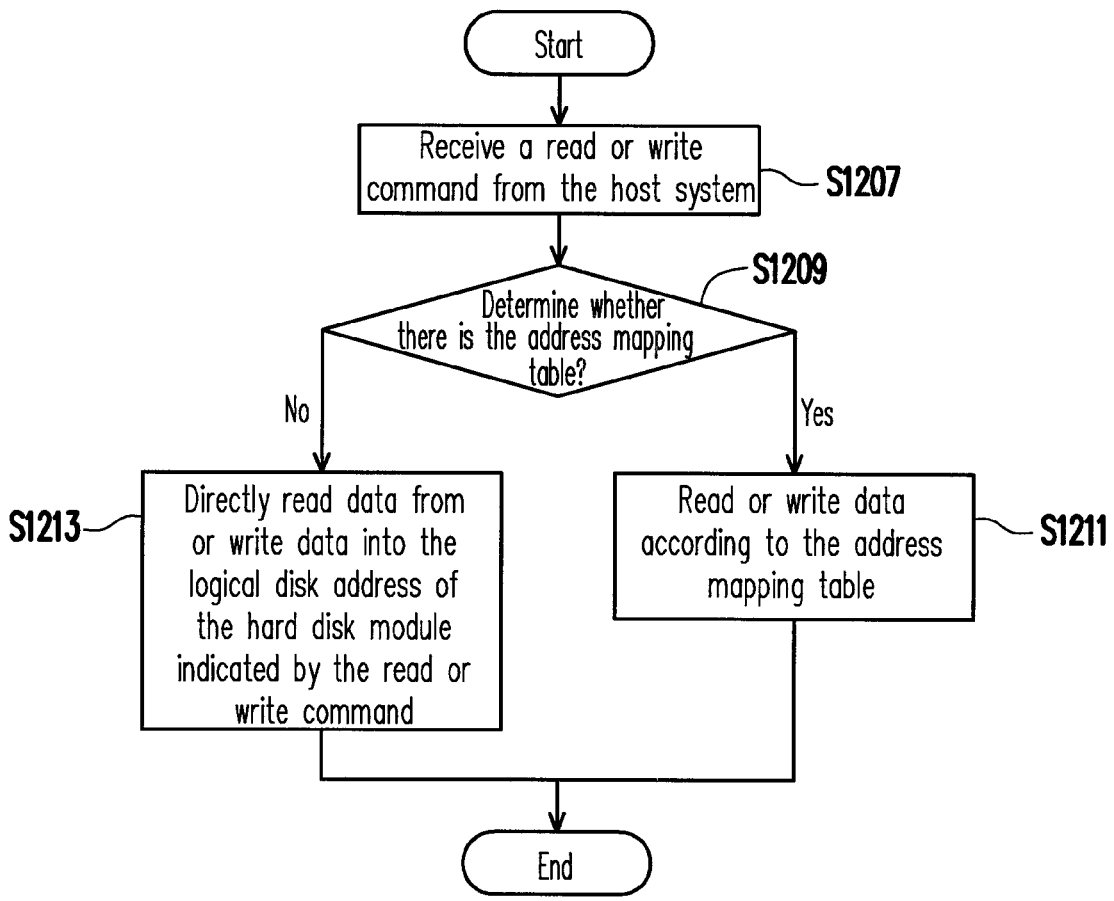
FIG. 12B is a flowchart of a data access process according to the first exemplary embodiment of the present invention.

FIG. 12B is a flowchart of a data access process according to the first exemplary embodiment of the present invention.

Referring to FIG. 12B, in step S1207, the hybrid storage medium controller 104 receives a read or write command from the host system 1000.

Then, in step S1209, the hybrid storage medium controller 104 determines whether there is the address mapping table 800.

If there is the address mapping table 800, in step S1211, the hybrid storage medium controller 104 reads or writes data according to the address mapping table 800. To be specific, before the re-mapping procedure is executed, the address mapping table 800 records the mapping relationship between the logical access addresses and the logical blocks and the logical disk addresses. Thus, the hybrid storage medium controller 104 stores data in the non-volatile memory module 106 and the hard disk module 108 according to the address mapping table 800.

If there is no address mapping table 800, in step S1213, the hybrid storage medium controller 104 directly reads data from or writes data into the logical disk address of the hard disk module 108 indicated by the read or write command. To be specific, after executing the re-mapping procedure, the storage medium management circuit 202 directly accesses the physical disk addresses 610(0)-610(J) mapped to the logical disk addresses 650(0)-650(J) according to the logical access addresses 710(0)-710(J) without using the address mapping table 800. Thus, the hybrid storage medium controller 104 only stores data in the hard disk module 108 if the address mapping table 800 does not exist.

It should be mentioned that as described above, the hybrid storage medium controller 104 may also access data according to the updated address mapping table 800 after the re-mapping procedure is executed. In another exemplary embodiment of the present invention, the step S1205 in FIG. 12A further includes updating the address mapping table 800. Besides, the hybrid storage medium controller 104 always accesses data according to the address mapping table 800 before and after the re-mapping procedure is executed.

Second Exemplary Embodiment

The hybrid storage apparatus in the second exemplary embodiment has a similar structure as that of the hybrid storage apparatus in the first exemplary embodiment, and the difference between the two hybrid storage apparatuses is that in hybrid storage apparatus of the second exemplary embodiment, the logical access addresses are re-mapped through gradual replacement. This will be described below with reference to FIG. 1A, FIG. 2, and FIG. 3.

Figure 13:
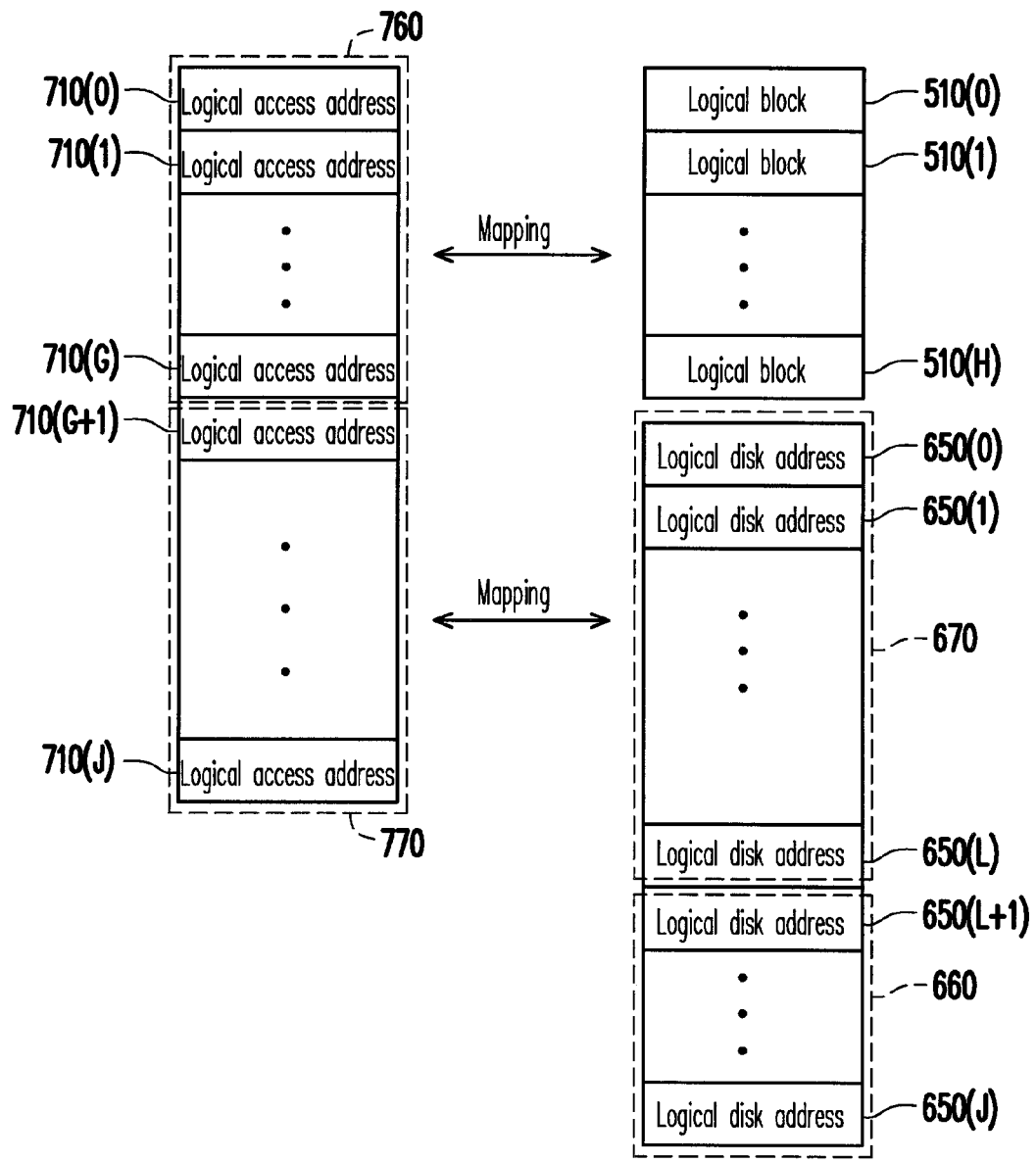
FIG. 13 illustrates an example of initial addressing according to a second exemplary embodiment of the present invention.
Figure 14:
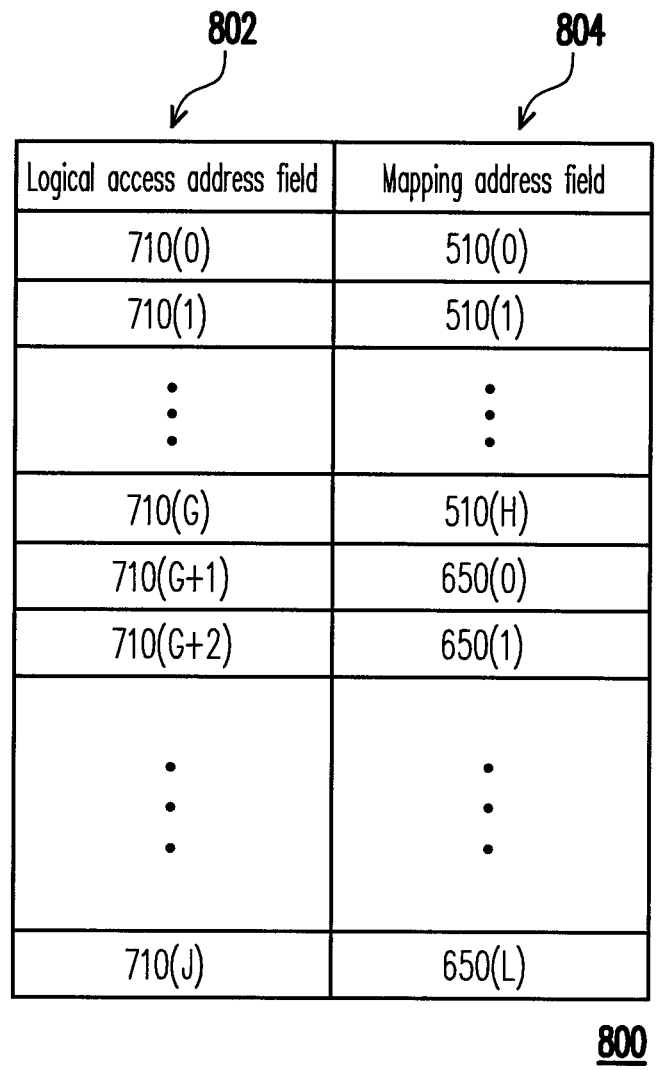
FIG. 14 illustrates an example of address mapping table based on the mapping relationship in FIG. 13.

FIG. 13 illustrates an example of initial addressing according to the second exemplary embodiment of the present invention, and FIG. 14 illustrates an example of address mapping table based on the mapping relationship in FIG. 13.

Referring to FIG. 13 and FIG. 14, in the present exemplary embodiment, when the hybrid storage apparatus 100 is formatted (for example, when the operating system of the host system 1000 is a file system), the storage medium management circuit 202 of the hybrid storage medium controller 104 groups the logical disk addresses 650(0)-650(L) into the second logical disk address cluster 670 and groups the logical disk addresses 650(L+1)-650(J) into the first logical disk address cluster 660. Herein the size of the logical disk addresses 650(L+1)-650(J) of the first logical disk address cluster 660 is the same as or smaller than the size of the logical blocks 510(0)-510(H).

In addition, the storage medium management circuit 202 groups the logical access addresses 710(0)-710(J) into the first logical access address cluster 760, which contains the logical access addresses 710(0)-710(G), and the second logical access address cluster 770, which contains the logical access addresses 710(G+1)-710(J). In particular, the size of the logical access addresses 710(0)-710(G) in the first logical access address cluster 760 is the same as the sizes of the logical blocks 510(0)-510(H), and the size of the logical access addresses 710(G+1)-710(J) of the second logical access address cluster 770 is the same as the size of the logical disk addresses 650(0)-650(L) of the second logical disk address cluster 670.

In the second exemplary embodiment, the storage medium management circuit 202 maps the logical access addresses 710(0)-710(G) of the first logical access address cluster 760 to the logical blocks 510(0)-510(H) and maps the logical access addresses 710(G+1)-710(J) of the second logical access address cluster 770 to the logical disk addresses 650(0)-650(L) of the second logical disk address cluster 670. Similarly, in the second exemplary embodiment, the storage medium management circuit 202 records the mapping relationships between the logical access addresses and the logical blocks and the mapping relationships between the logical access addresses and the logical disk addresses in the address mapping table 800 to complete the addressing process. When the host system 1000 gives a write or read command to access the logical access addresses 710(0)-710(J), the storage medium management circuit 202 writes data into or reads data from the non-volatile memory module 106 or the hard disk module 108 according to the address mapping table 800.

It should be mentioned that in the first exemplary embodiment, the storage medium management circuit 202 executes the re-mapping procedure to prolong the lifespan of the hybrid storage apparatus 100 when the number of bad blocks in the non-volatile memory module 106 exceeds the predetermined threshold. However, in the second exemplary embodiment, the storage medium management circuit 202 gradually maps the logical disk addresses 650(L+1)-650(J) in the first logical disk address cluster 660 to the corresponding logical access addresses instead of the logical blocks when there is no more normal physical block in the replacement area 408.

To be specific, as described above, a physical block mapped to a logical block is damaged after it is repeatedly erased for a certain number of times, and the storage medium management circuit 202 gets a normal physical block from the replacement area 408 to replace the damaged physical block. Particularly, the storage medium management circuit 202 executes the re-mapping procedure when there is no more normal physical block in the replacement area 408.

Figure 15:
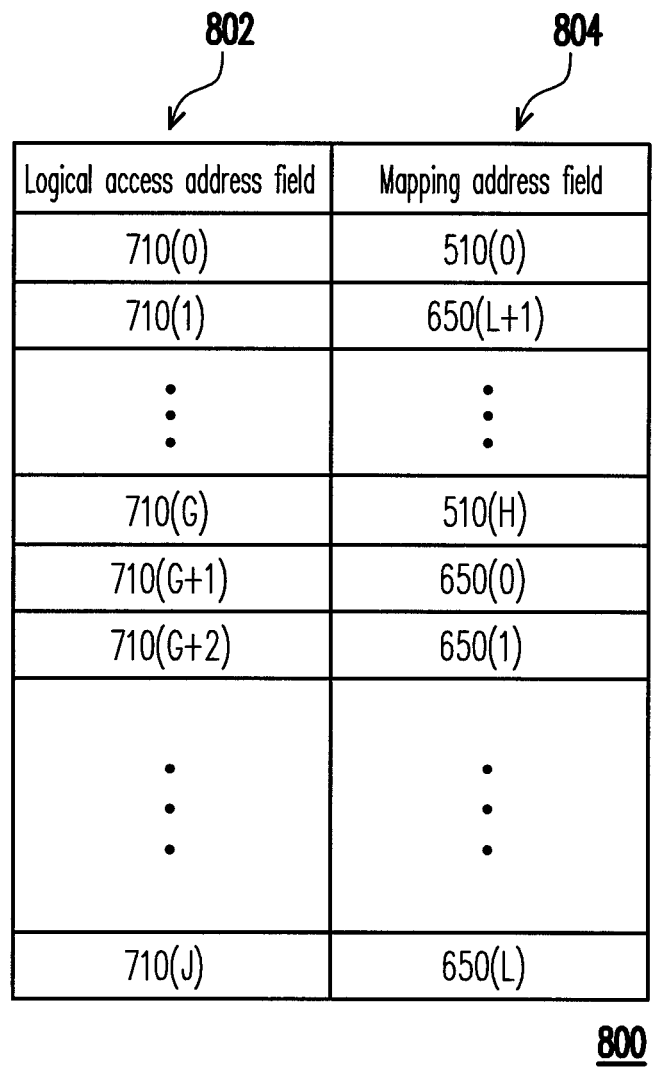
FIG. 15 illustrates an example of address mapping table after a re-mapping procedure is executed according to the second exemplary embodiment of the present invention.

For example, it is assumed that the logical access address 710(1) is mapped to the logical block 510(1) and the logical block 510(1) is mapped to the physical block 304(1), if the physical block 304(1) becomes a bad block and there is no more normal physical block in the replacement area 408, the storage medium management circuit 202 maps the logical access address 710(1) to the logical disk address 650(L+1) in the address mapping table 800 and writes the data to be written into the logical access address 710(1) by the host system 1000 into the physical disk address mapped to the logical disk address 650(L+1) (as shown in FIG. 15).

Namely, when a physical block is damaged and there is no more normal physical block in the replacement area 408, a logical disk address in the first logical disk address cluster 660 is gotten to replace the logical block mapped to the bad block and is re-mapped to the logical access address.

Accordingly, similar to that in the first exemplary embodiment, when the hybrid storage apparatus 100 is used as the primary hard drive for installing the operating system, the operating system is usually installed in the logical access addresses 710(0)-710(G). Because the logical access addresses 710(0)-710(G) are mapped to the logical blocks 510(0)-510(H) of the non-volatile memory module 106, the hybrid storage apparatus 100 in the second exemplary embodiment offers a higher performance than a hard drive composed of conventional hard disks. In addition, the lifespan of the hybrid storage apparatus 100 can be effectively prolonged by replacing the logical block mapped to any bad block with a logical disk address in the first logical disk address cluster 660 of the hard disk module 108.

The steps in the initial addressing method in the second exemplary embodiment are similar to those illustrated in FIG. 11 therefore will not be described herein. Below, steps in the re-mapping procedure will be described.

Figure 16:
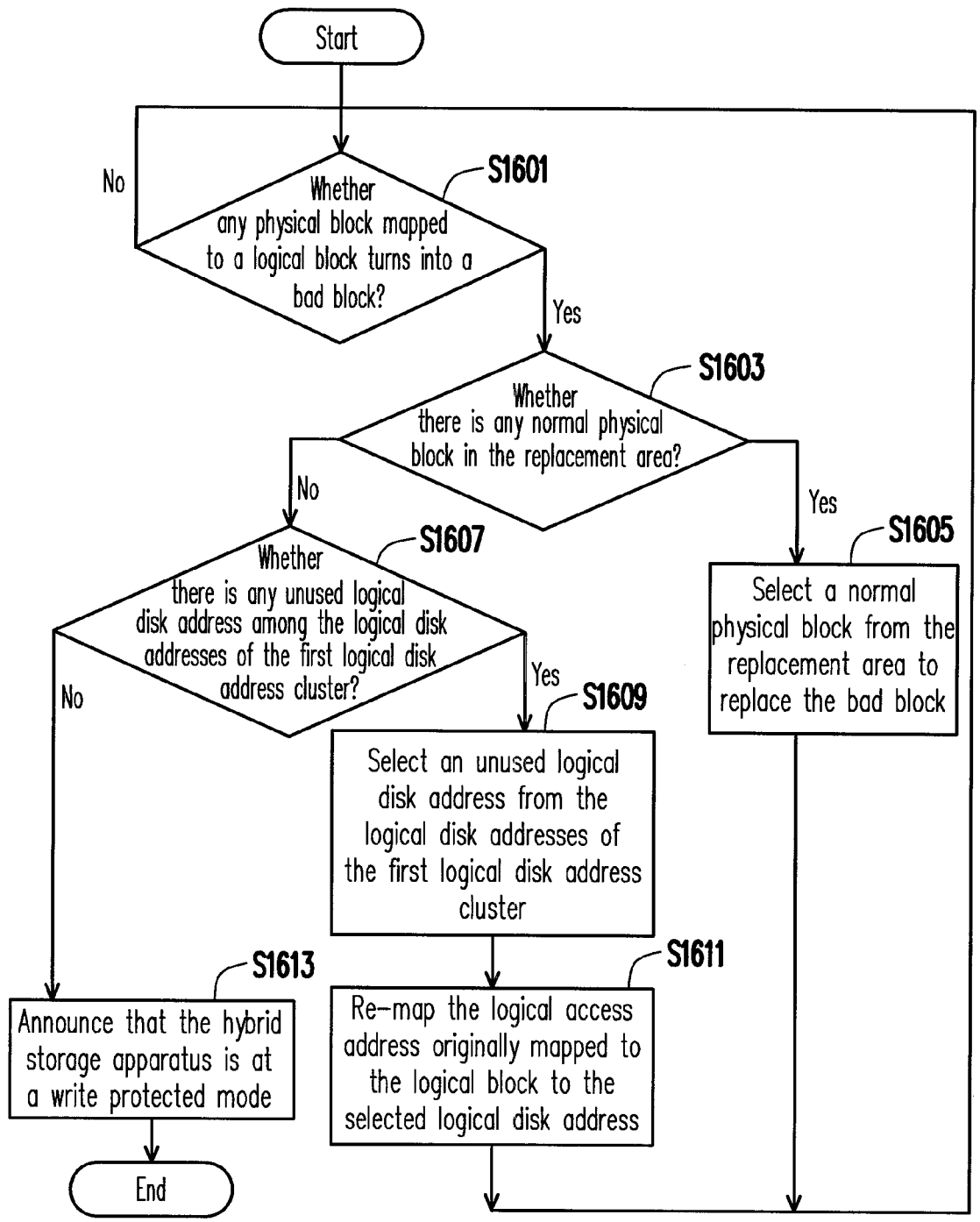
FIG. 16 is a flowchart of a re-mapping procedure according to the second exemplary embodiment of the present invention.

FIG. 16 is a flowchart of a re-mapping procedure according to the second exemplary embodiment of the present invention.

Referring to FIG. 16, in step S1601, the hybrid storage medium controller 104 constantly detects whether any physical block mapped to a logical block becomes a bad block.

If a physical block mapped to a logical block becomes a bad block, in step S1603, the hybrid storage medium controller 104 determines whether there is any normal physical block in the replacement area 408.

If there are normal physical blocks in the replacement area 408, in step S1605, the hybrid storage medium controller 104 gets a normal physical block from the replacement area 408 to replace the bad block, and the procedure illustrated in FIG. 16 then returns to step S1601.

If there is no normal physical block in the replacement area 408, in step S1607, the hybrid storage medium controller 104 determines whether there is any unused logical disk address among the logical disk addresses 650(L+1)-650(J) in the first logical disk address cluster 660.

If there are unused logical disk addresses among the logical disk addresses 650(L+1)-650(J) in the first logical disk address cluster 660, in step S1609, the hybrid storage medium controller 104 gets an unused logical disk address from the logical disk addresses 650(L+1)-650(J) in the first logical disk address cluster 660. In step S1611, the hybrid storage medium controller 104 re-maps the logical access address originally mapped to the logical block to the gotten logical disk address (as shown in FIG. 15), and the procedure illustrated in FIG. 16 then returns to the step S1601.

If there is no more unused logical disk address among the logical disk addresses 650(L+1)-650(J) in the first logical disk address cluster 660, in step S1613, the hybrid storage medium controller 104 announces that the hybrid storage apparatus 100 is at a write protected mode and the host system 1000 is not allowed to write data into the hybrid storage apparatus 100 anymore.

In summary, compared to a conventional hard disk, the hybrid storage apparatus and the hybrid storage medium controller and the addressing method thereof in the present invention can effectively improve the data access efficiency. In addition, the lifespan of the hybrid storage apparatus in the present invention is effectively prolonged compared to that of a conventional memory storage apparatus. The previously described exemplary embodiments of the present invention have the advantages aforementioned, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A hybrid storage apparatus, comprising:
a connector, configured for connecting to a host system;
a non-volatile memory module, having a plurality of physical blocks;
a hard disk module, having a plurality of physical disk addresses; and
a hybrid storage medium controller, coupled to the connector, the non-volatile memory module, and the hard disk module,
wherein the hybrid storage medium controller is configured to group the physical blocks into at least a storage area and a replacement area, arrange a plurality of logical blocks to map to the physical blocks of the storage area and arrange a plurality of logical disk addresses to map to the physical disk addresses of the hard disk module,
wherein the hybrid storage medium controller is further configured to group the logical disk addresses into at least a first logical disk address cluster and a second logical disk address cluster,
wherein the hybrid storage medium controller is further configured to arrange a plurality of logical access addresses to be accessed by the host system and groups the logical access addresses into a first logical access address cluster and a second logical access address cluster,
wherein the hybrid storage medium controller is further configured to initially map the logical access addresses of the first logical access address cluster to the logical blocks and map the logical access addresses of the second logical access address cluster to the logical disk addresses of the second logical disk address cluster,
wherein the hybrid storage medium controller is further configured to determine whether the number of bad blocks among the physical blocks exceeds a predetermined threshold,
wherein when the number of bad blocks among the physical blocks exceeds the predetermined threshold, the hybrid storage medium controller is further configured to copy data stored in the physical blocks mapped to the logical blocks to the physical disk addresses mapped to the logical disk addresses of the first logical disk address cluster and re-maps the logical access addresses of the first logical access address cluster to the logical disk addresses of the first logical disk address cluster.

2. The hybrid storage apparatus according to claim 1, wherein the hybrid storage medium controller is configured to establish and maintain an address mapping table to record mapping relationships between the logical access addresses and the logical blocks and mapping relationships between the logical access addresses and the logical disk addresses of the second logical disk address cluster.

3. The hybrid storage apparatus according to claim 2, wherein the hybrid storage medium controller is configured to store the address mapping table in the physical disk addresses mapped to the logical disk addresses of the first logical disk address cluster.

4. The hybrid storage apparatus according to claim 1, wherein the size of the logical disk addresses of the first logical disk address cluster is the same as the size of the logical blocks.

5. A hybrid storage apparatus, comprising:
a connector, configured for connecting to a host system;
a non-volatile memory module, having a plurality of physical blocks;
a hard disk module, having a plurality of physical disk addresses; and
a hybrid storage medium controller, coupled to the connector, the non-volatile memory module, and the hard disk module,
wherein the hybrid storage medium controller is configured to group the physical blocks into at least a storage area and a replacement area, arrange a plurality of logical blocks to map to the physical blocks of the storage area and arrange a plurality of logical disk addresses to map to the physical disk addresses of the hard disk module,
wherein the hybrid storage medium controller is further configured to group the logical disk addresses into at least a first logical disk address cluster and a second logical disk address cluster,
wherein the hybrid storage medium controller is further configured to arrange a plurality of logical access addresses to be accessed by the host system and groups the logical access addresses into a first logical access address cluster and a second logical access address cluster,
wherein the hybrid storage medium controller is further configured to initially map the logical access addresses of the first logical access address cluster to the logical blocks and map the logical access addresses of the second logical access address cluster to the logical disk addresses of the second logical disk address cluster, wherein when the physical block mapped to one of the logical blocks becomes a bad block, the hybrid storage medium controller is further configured to determine whether there is a normal physical block among the physical blocks in the replacement area, wherein when there is no normal physical block among the physical blocks in the replacement area, the hybrid storage medium controller is further configured to map one of the logical access addresses in the first logical access address cluster that is originally mapped to the logical block to one of the logical disk addresses in the first logical disk address cluster.

6. The hybrid storage apparatus according to claim 5, wherein the size of the logical disk addresses in the first logical disk address cluster is the same as or smaller than the size of the logical blocks.

7. A hybrid storage medium controller, for managing a non-volatile memory module and a hard disk module, wherein the non-volatile memory module has a plurality of physical blocks, and the hard disk module has a plurality of physical disk addresses, the hybrid storage medium controller comprising:

a host interface, configured to couple to a host system;

a storage medium interface, configured to couple to the non-volatile memory module and the hard disk module; and a storage medium management circuit, coupled to the host interface and the storage medium interface, wherein the storage medium management circuit is configured to group the physical blocks into at least a storage area and a replacement area, configure a plurality of logical blocks to map to the physical blocks in the storage area and configure a plurality of logical disk addresses to map to the physical disk addresses of the hard disk module, wherein the storage medium management circuit is configured to groups the logical disk addresses into at least a first logical disk address cluster and a second logical disk address cluster, wherein the storage medium management circuit is further configured to configure a plurality of logical access addresses to be accessed by the host system and group the logical access addresses into a first logical access address cluster and a second logical access address cluster, wherein the storage medium management circuit is further configured to initially map the logical access addresses of the first logical access address cluster to the logical blocks and map the logical access addresses of the second logical access address cluster to the logical disk addresses of the second logical disk address cluster, wherein the storage medium management circuit is further configured to determine whether the number of bad blocks among the physical blocks exceeds a predetermined threshold, wherein when the number of bad blocks among the physical blocks exceeds the predetermined threshold, the storage medium management circuit is further configured to copy data stored in the physical blocks mapped to the logical blocks to the physical disk addresses mapped to the logical disk addresses of the first logical disk address cluster and re-map the logical access addresses of the first logical access address cluster to the logical disk addresses of the first logical disk address cluster.

8. A hybrid storage medium controller, for managing a non-volatile memory module and a hard disk module, wherein the non-volatile memory module has a plurality of physical blocks, and the hard disk module has a plurality of physical disk addresses, the hybrid storage medium controller comprising:

a host interface, configured to couple to a host system;

a storage medium interface, configured to couple to the non-volatile memory module and the hard disk module; and a storage medium management circuit, coupled to the host interface and the storage medium interface, wherein the storage medium management circuit is configured to group the physical blocks into at least a storage area and a replacement area, configure a plurality of logical blocks to map to the physical blocks in the storage area and configure a plurality of logical disk addresses to map to the physical disk addresses of the hard disk module, wherein the storage medium management circuit is configured to groups the logical disk addresses into at least a first logical disk address cluster and a second logical disk address cluster, wherein the storage medium management circuit is further configured to configure a plurality of logical access addresses to be accessed by the host system and group the logical access addresses into a first logical access address cluster and a second logical access address cluster, wherein the storage medium management circuit is further configured to initially map the logical access addresses of the first logical access address cluster to the logical blocks and map the logical access addresses of the second logical access address cluster to the logical disk addresses of the second logical disk address cluster, wherein when the physical block mapped to one of the logical blocks becomes a bad block, the storage medium management circuit is further configured to determine whether there is a normal physical block among the physical blocks in the replacement area, wherein when there is no normal physical block among the physical blocks in the replacement area, the storage medium management circuit is further configured to map one of the logical access addresses in the first logical access address cluster mapped to the logical block to one of the logical disk addresses in the first logical disk address cluster.

9. An addressing method, for a hybrid storage apparatus having a non-volatile memory module and a hard disk module, wherein the non-volatile memory module has a plurality of physical blocks, and the hard disk module has a plurality of physical disk addresses, the addressing method comprising:

grouping the physical blocks into at least a storage area and a replacement area;

configuring a plurality of logical blocks to be mapped to the physical blocks in the storage area;

configuring a plurality of logical disk addresses to be mapped to the physical disk addresses of the hard disk module, grouping the logical disk addresses into at least a first logical disk address cluster and a second logical disk address cluster;

grouping a plurality of logical access addresses to be accessed by a host system;

grouping the logical access addresses into a first logical access address cluster and a second logical access address cluster;
initially mapping the logical access addresses of the first logical access address cluster to the logical blocks and mapping the logical access addresses of the second logical access address cluster to the logical disk addresses of the second logical disk address cluster;
when the physical block mapped to one of the logical blocks becomes a bad block, determining whether there is a normal physical block among the physical blocks in the replacement area; and
when there is no normal physical block among the physical blocks in the replacement area, mapping one of the logical access addresses in the first logical access address cluster mapped to the logical block to one of the logical disk addresses in the first logical disk address cluster.

10. The addressing method according to claim 9, wherein the step of grouping the logical disk addresses into the first logical disk address cluster and the second logical disk address cluster comprises:
grouping a portion of the logical disk addresses into the first logical disk address cluster, wherein the size of the logical disk addresses in the first logical disk address cluster is the same as or smaller than the size of the logical blocks; and
grouping other portion of the logical disk addresses into the second logical disk address cluster.

11. An addressing method, for a hybrid storage apparatus having a non-volatile memory module and a hard disk module, wherein the non-volatile memory module has a plurality of physical blocks, and the hard disk module has a plurality of physical disk addresses, the addressing method comprising:
grouping the physical blocks into at least a storage area and a replacement area;
configuring a plurality of logical blocks to be mapped to the physical blocks in the storage area;
configuring a plurality of logical disk addresses to be mapped to the physical disk addresses of the hard disk module,
grouping the logical disk addresses into at least a first logical disk address cluster and a second logical disk address cluster;
grouping a plurality of logical access addresses to be accessed by a host system;
grouping the logical access addresses into a first logical access address cluster and a second logical access address cluster;
initially mapping the logical access addresses of the first logical access address cluster to the logical blocks and mapping the logical access addresses of the second logical access address cluster to the logical disk addresses of the second logical disk address cluster;
determining whether the number of bad blocks among the physical blocks exceeds a predetermined threshold; and
when the number of bad blocks among the physical blocks exceeds the predetermined threshold, copying data stored in the physical blocks mapped to the logical blocks to the physical disk addresses mapped to the logical disk addresses of the first logical disk address cluster, and re-mapping the logical access addresses of the first logical access address cluster to the logical disk addresses of the first logical disk address cluster.

12. The addressing method according to claim 11, wherein the step of grouping the logical disk addresses into the first logical disk address cluster and the second logical disk address cluster comprises:
grouping a portion of the logical disk addresses into the first logical disk address cluster, wherein the size of the logical disk addresses in the first logical disk address cluster is the same as the size of the logical blocks; and
grouping other portion of the logical disk addresses into the second logical disk address cluster.

* * * * *